UNITED STATES PATENT OFFICE.

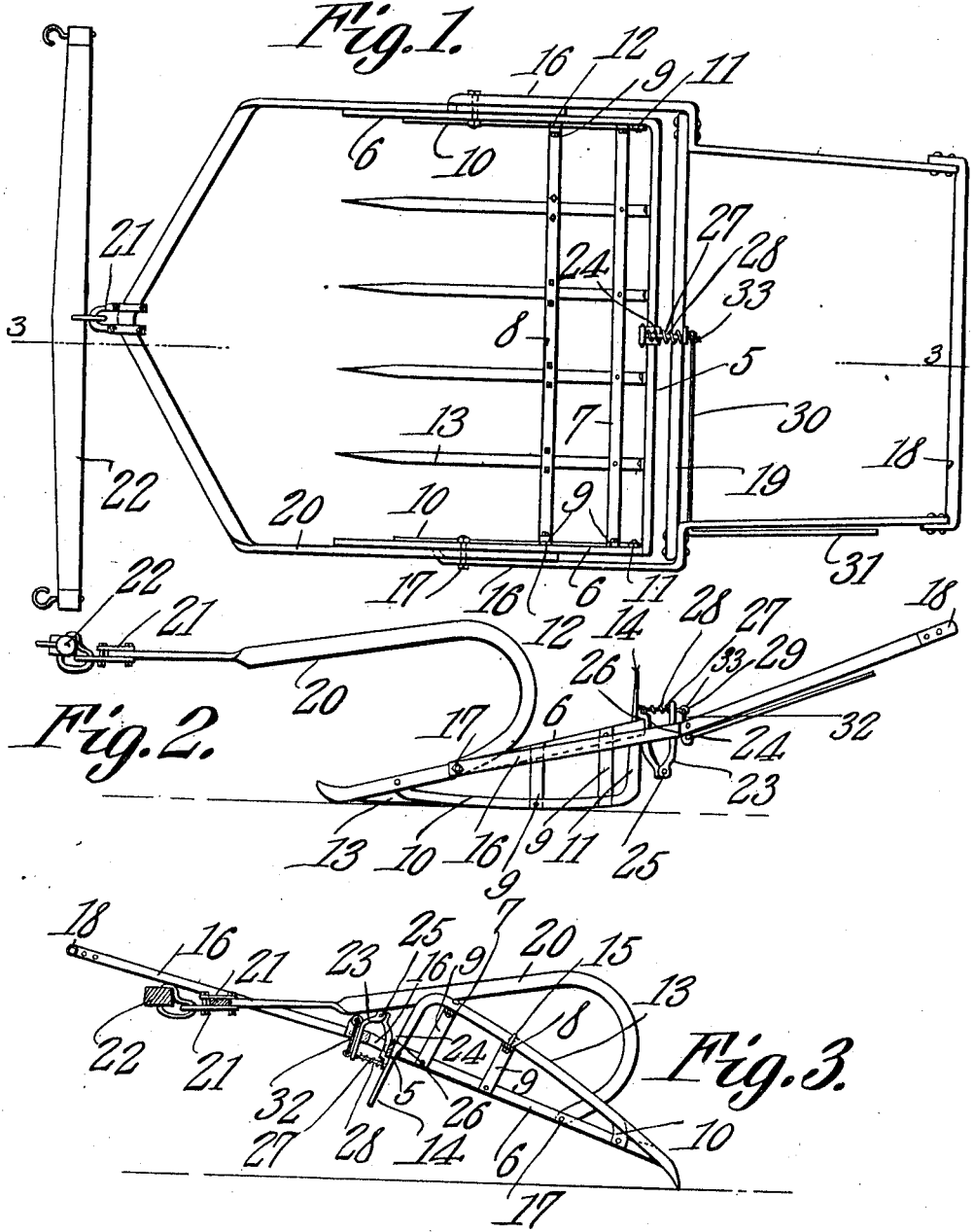

ROY C. GLISE, OF PROSPER, MINNESOTA.

SCRAPER.

970,323.

Specification of Letters Patent. Patented Sept. 13, 1910.

Application filed November 1, 1909. Serial No. 525,762.

*To all whom it may concern:*

Be it known that I, ROY C. GLISE, a citizen of the United States, residing at Prosper, in the county of Fillmore and State of Minnesota, have invented a new and useful Scraper, of which the following is a specification.

This invention relates to scrapers designed more particularly for handling manure, and it is the object of the invention to provide a scraper of this kind which is strong and durable, and which can be easily operated to scrape up, carry, and dump the load.

Another object of the invention is to provide a structure which enables the load to be dumped, and the scraper to be righted, without stopping the team.

The invention also has for its object to provide an improved device for locking the scraper, together with easily operated means for releasing the locking means.

With these objects in view, the invention consists in a novel construction and arrangement of parts to be hereinafter described and claimed, reference being had to the drawing hereto annexed in which—

Figure 1 is a plan view of the scraper. Fig. 2 is a side elevation. Fig. 3 is a central horizontal section of the scraper in dumping position.

The scraper frame comprises a rear cross bar 5 which is bent forwardly and downwardly at its ends to form the side tines 6 of a fork which is the scraper proper. The frame also comprises cross bars 7 and 8 which are bent upwardly at their ends as indicated at 9, and have said bent up portions fastened to the tines 6, near the rear ends thereof. Below the tines 6 are located braces 10 which also serve as runners for the scraper. These braces are fastened at one end to the tines 6 near their front ends, and to the inner faces of the latter, and at their opposite ends, they are bent upwardly as indicated at 11, and fastened to the tines at the rear ends thereof. The braces are also connected to the upstanding portions 9 of the cross bar 8 by straps 12.

Between the tines 6 are located a series of tines 13, sharpened at their front ends, and bent up slightly at both ends so that they may slide over the ground without dumping. The rear ends of these tines are bent up to form the back of the scraper, and are bolted or otherwise fastened to the cross bar 5, from which they rise a short distance as indicated at 14, which is for a purpose to be presently described. The tines are also bolted to the cross bar 7, and fastened to the cross bar 8 by loops 15, the latter being provided so that the tines are not weakened at this point of boring.

The handle of the scraper comprises parallel side bars 16 pivoted at 17 to the tines 6, on the outside thereof, and extending rearwardly therefrom, and bent inwardly behind the cross bar 5 for a short distance, then continued rearwardly to a cross bar or grip 18. At their inturned portions, the bars 16 are connected by a cross bar 19 extending parallel to the cross bar 5, and spaced a short distance therefrom. To the tines 6 is also pivotally connected a bail 20 for attachment of the draft animal, the front end of the bail carrying a clevis 21 to which a whiffle tree 22 is connected. The draft bail is connected to the pivot 17 of the handle bars 16, this pivot being located near the front end of the scraper, and the bail is located between the bars 16 and the tines 6, so that the scraper may swing within the bail.

The bail comprises parallel bars which are curved rearwardly and upwardly from the pivot 17, and extended to a point in front of the tines, at which point they converge toward the clevis 21. The forwardly extending portion of the bail is located a sufficient distance above the scraper so as not to interfere with the filling and dumping thereof.

For locking the scraper relatively to the handle, there is provided a device comprising a bracket 23 mounted on the cross bar 19, and carrying a latch 24, the latter being pivoted to the bracket as indicated at 25, to swing in the direction of the cross bar 5, and having in its face, opposite said cross bar, a recess 26 adapted to be entered thereby. The face of the latch, below the recess, is beveled, so that it is automatically swung back when the cross bar comes in contact with said beveled surface, and the latch then snaps over the cross bar. The latch is held in locking position by a spring 27 located between the latch and the bracket, and coiled around a stem 28 pivotally connected at one end to the free end of the latch, and passing loosely to an opening in the bracket, from which it projects, the projecting end of the stem being formed with an eye 29.

The latch is operated by a rock shaft 30 mounted in bearings on the bracket 23 and on one of the handle bars, and formed at one end with an operating handle 31. The other end of the rock shaft terminates in a lateral bend 32 having a finger 33 which extends into the eye 29. Upon rocking the shaft 30 in one direction, the finger 33 is swung in a direction to pull the latch toward the bracket, and thus release the cross bar 5. This movement of the latch compresses the spring 27, so that when the rock shaft is released, the latch, by the expansion of the spring, is restored to its normal position, ready for locking the cross bar.

Figs. 1 and 2 show the position of the scraper when it is loaded, and ready to be dragged to the dumping place, or about to be dragged over the ground to be loaded. In this position the latch 24 is in engagement with the cross bar 5, and the handle and the scraper are thus locked against movement relative to each other. To dump the load, the rear end of the scraper is elevated by the handle sufficiently to enter the points of the tines in the ground. The forward movement of the team then causes the scraper to flop over, and thus dump its load. In this position, with the handle resting on the whiffle tree 22 as shown in Fig. 3, and the points of the tines in contact with the ground, the scraper may be dragged until it is to be restored to loading position.

To restore the scraper to loading and carrying position, the cross bar 5 is released, whereupon the rear end of the scraper, which is now in front, drops down, the projecting ends 14 of the tines then coming in contact with the ground, and when the team continues to travel forwardly, the scraper flops over and is automatically righted, the handle in the meantime being swung to its normal position, so that the cross bar 5 may be locked thereto when it strikes the latch. The scraper may also be righted by releasing the cross bar 5 as soon as the dumping commences, and then continuing to drive the team forwardly, whereupon the scraper makes a complete revolution, thus dumping, and then righting itself.

The operation herein described may be carried out without stopping the team. The scraper slides over the ground easily without dumping, and dumps easily when desired. The construction of the bail allows the tines to sink deep into the material to be hauled and also enables the scraper to fill at the edges. The tines are so secured that any one may be removed without removing the others.

The preferred embodiment of the invention has been herein shown and described, but it will be understood that various minor changes in the structural details thereof may be resorted to, without departing from the invention.

What is claimed is:

1. A scraper comprising a frame carrying a series of tines, a handle pivoted to the sides of the frame, and having a cross bar extending behind the rear end thereof, a draft bail pivotally connected to the frame, a latch carried by the cross bar of the handle, and engageable with the rear end of the frame, and means for releasing the latch.

2. A scraper comprising a scraper body, a handle pivoted to the sides of the body, and having a cross bar extending behind the rear end thereof, a bracket carried by the cross bar, a latch pivoted to the bracket, and engageable with the rear end of the body, a stem pivotally connected to the free end of the latch, and passing loosely through the bracket, a spring coiled around the stem between the latch and the bracket, a rock shaft carried by the handle, and operatively connected to the stem, means for operating the rock shaft, and a draft bail pivotally connected to the body.

3. A scraper comprising a scraper body, a handle pivoted to the sides of the body, and having a cross bar extending behind the rear end thereof, a draft bail pivoted to the sides of the body, and curved rearwardly and forwardly from the pivot, a latch carried by the cross bar of the handle, and engageable with the rear end of the body, and means for releasing the latch.

4. A scraper comprising a frame consisting of a rear cross bar bent forwardly to form a pair of tines, a runner connected at one end to the front ends of said tines, and having at its opposite end an upright portion connected to the rear ends of said tines, cross bars having upstanding portions at their ends connected to the tines, and tines mounted on said cross bars, and bent upwardly at their rear ends and secured to the rear cross bar, a handle and a draft bail pivoted to the first-mentioned tines, a cross bar carried by the handle, and extending behind the aforesaid rear cross bar, a latch carried by the cross bar of the handle, and engageable with the rear cross bar, and means for releasing the latch.

5. A scraper comprising a scraper body carrying stems projecting above the rear end of the body, a handle pivoted to the sides of the body and having a cross bar extending behind the rear end thereof, a draft bail pivotally connected to the body, a latch carried by the cross bar of the handle, and engageable with the rear end of the body, and means for releasing the latch.

6. A scraper comprising a scraper body carrying stems projecting above the rear end of the body, a handle pivoted to the sides of the body, a draft bail pivotally connected to the frame, the pivot of the bail coinciding with the pivot of the handle, a latch carried by the handle, and engageable with the rear end of the body, and means for releasing the latch.

7. A scraper comprising a scraper body, a handle pivoted to the sides of the body, and having a cross bar extending behind the rear end thereof, a draft bail pivotally connected to the body the pivots of the handle and draft bail coinciding, a latch carried by the cross bar of the handle, and engageable with the rear end of the body, and means for releasing the latch.

In testimony that I claim the foregoing as my own, I have hereto affixed my signature in the presence of two witnesses.

ROY C. GLISE.

Witnesses:
H. IVERSON,
A. E. TOLLEFSON.